United States Patent
Taoka et al.

(10) Patent No.: US 8,111,305 B2
(45) Date of Patent: Feb. 7, 2012

(54) APPARATUS FOR PHOTOGRAPHING HAVING MULTIPLE ZOOM DEVICES AND ASSOCIATED METHOD

(75) Inventors: Mineki Taoka, Yokohama (JP); Masayu Higuchi, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 453 days.

(21) Appl. No.: 11/895,158

(22) Filed: Aug. 23, 2007

(65) Prior Publication Data

US 2008/0158393 A1    Jul. 3, 2008

(30) Foreign Application Priority Data

Dec. 28, 2006  (JP) .................................. 2006-356150

(51) Int. Cl.
   *H04N 5/262*   (2006.01)
(52) U.S. Cl. ............. 348/240.2; 348/240.99; 348/240.1
(58) Field of Classification Search ............... 348/240.2; 359/676
   See application file for complete search history.

(56) References Cited

U.S. PATENT DOCUMENTS

| | | | |
|---|---|---|---|
| 6,727,947 B1 * | 4/2004 | Kobayashi et al. ...... | 348/333.01 |
| 6,757,013 B2 * | 6/2004 | Matsuzaka ................ | 348/240.1 |
| 7,256,944 B2 * | 8/2007 | Labaziewicz et al. .... | 359/676 |
| 2001/0055066 A1 * | 12/2001 | Nozawa ..................... | 348/240 |
| 2004/0174444 A1 | 9/2004 | Ishii | |
| 2006/0056046 A1 * | 3/2006 | Saori ......................... | 359/680 |
| 2006/0187310 A1 * | 8/2006 | Janson et al. ............. | 348/218.1 |
| 2007/0120988 A1 * | 5/2007 | Akiyama et al. ......... | 348/240.99 |
| 2010/0013960 A1 | 1/2010 | Ishii | |

FOREIGN PATENT DOCUMENTS

| | | |
|---|---|---|
| CN | 1527588 A | 9/2004 |
| JP | 05-191704 A | 7/1993 |
| JP | 2004-266774 A | 9/2004 |
| JP | 2006-217577 A | 8/2006 |

OTHER PUBLICATIONS

Office Action established for JP2006-356150, Aug. 10, 2010.
Office Action established for CN 200710162481.6, Oct. 13, 2010.
Office Action established for CN 200710162481.6 (Sep. 15, 2011).

* cited by examiner

*Primary Examiner* — Lin Ye
*Assistant Examiner* — Chia-Wei A Chen
(74) *Attorney, Agent, or Firm* — Drinker Biddle & Reath LLP (57) ABSTRACT

A photographing apparatus includes a first digital zoom device, a second digital zoom device capable of zooming at a higher magnification power than the first digital zoom device, a manipulation unit for performing manipulation of zoom, and a conversion unit for performing conversion between the first and second digital zoom devices when a predetermined magnification power is reached through the manipulation of the manipulation unit. A photographing method includes performing zoom manipulation, determining whether a magnification power according to the zoom manipulation reaches a predetermined reference magnification power to convert between a first digital zoom device and a second digital zoom device capable of zooming at a higher magnification power than the first digital zoom device, and converting the first digital zoom device and the second digital zoom device when the magnification power reaches the predetermined magnification.

21 Claims, 6 Drawing Sheets

APPARATUS FOR PHOTOGRAPHING HAVING MULTIPLE ZOOM DEVICES AND ASSOCIATED METHOD

CROSS-REFERENCE TO RELATED PATENT APPLICATIONS

This application claims the benefit of Japanese Patent Application No. 2006-356150, filed on Dec. 28, 2006, in the Japanese Intellectual Property Office, the disclosure of which is incorporated herein in its entirety by reference.

BACKGROUND OF THE INVENTION

1. Field of the Invention

The present invention relates to a photographing apparatus and method. More particularly, the present invention relates to a photographing apparatus and method employing multiple digital zoom devices that are used to achieve a desired magnification.

2. Description of the Related Art

A photographing apparatus for photographing a still image or moving picture performs a zoom process to magnify and photograph an object located at a far position. The zoom process includes an optical zoom processing method and a digital zoom processing method. The optical zoom processing method enables enlargement photographing of an object by adjusting the positions of lenses. The digital zoom processing method enables enlargement photographing of an object by electronically magnifying an image photographed through a lens. Zoom processing technology according to the optical zoom processing method and the digital zoom processing method is disclosed, for example, in Japanese Patent Publication No. 2006-217577.

The digital zoom processing method includes a first method of magnifying an image using a pipe line (Mode 1), and a second method of temporarily storing an image and magnifying the stored image (Mode 2).

Figure 5:
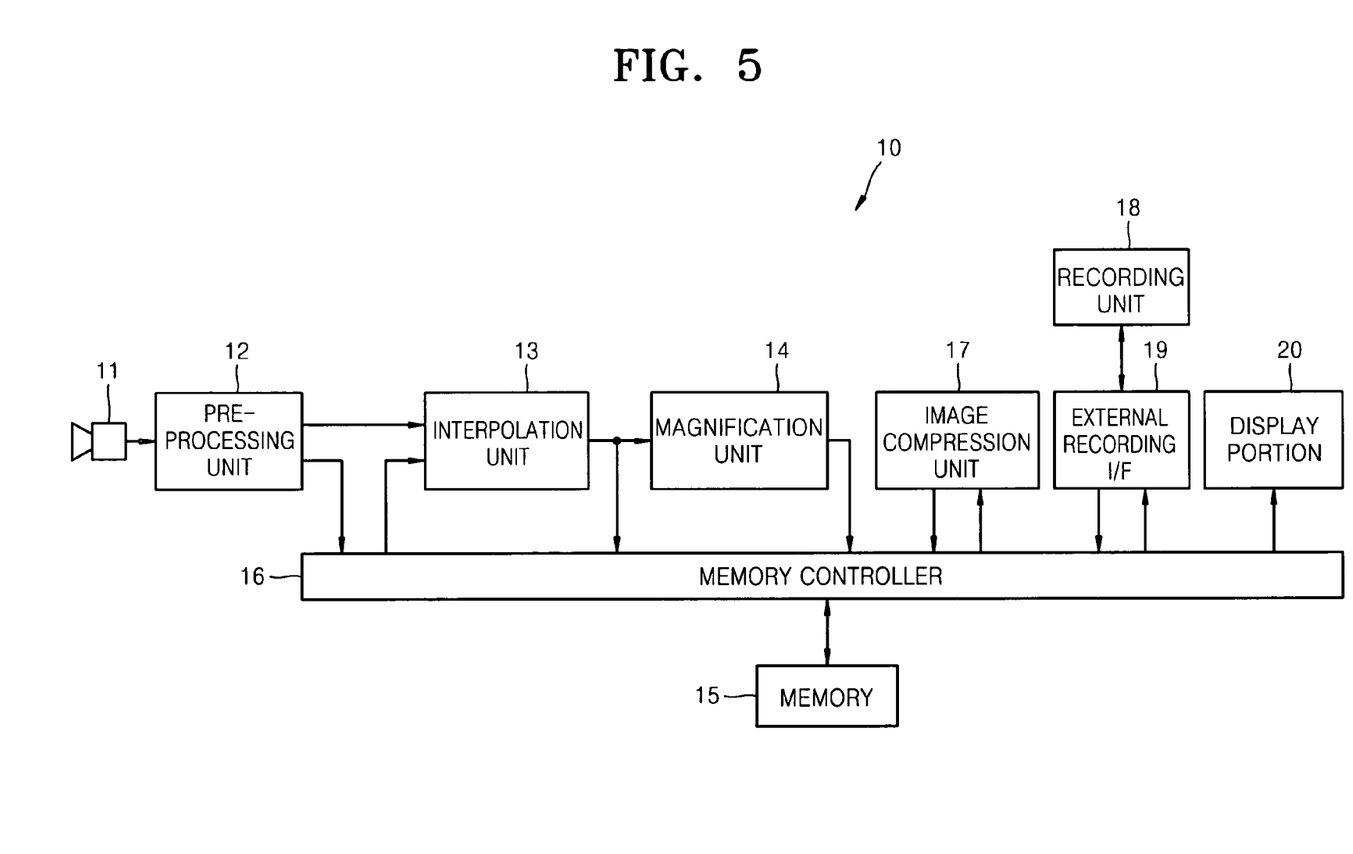
FIG. 5 is a block diagram illustrating the configuration of the conventional photographing apparatus.

FIG. 5 is a block diagram illustrating the configuration of a conventional photographing apparatus. Referring to FIG. 5, a photographing apparatus 10 according to the conventional technology includes a photographing unit 11, a pre-processing unit 12, an interpolation unit 13, a magnification unit 14, a memory 15, a memory controller 16, an image compression unit 17, a recording unit 18, an external recording I/F (interface) 19, and a display portion 20.

In Mode 1, the photographed image data is directly magnified. That is, in Mode 1, for the image data photographed by the photographing unit 11, the pre-processing unit 12 generates evaluation values such as auto exposure (AE), auto focus (AF), and auto white balance (AWB), the interpolation unit 13 interpolates the photographed image data, and the magnification unit 14 magnifies the image data.

In Mode 2, the photographed image data is stored in the memory 15 and a portion needed (e.g., only that portion needed) for zoom processing is extracted and magnified. That is, in Mode 2, for the image data photographed by the photographed unit 11, the pre-processing unit 12 generates evaluation values such as auto exposure (AE), auto focus (AF), and auto white balance (AWB). When the evaluation values are generated, they are temporarily stored in the memory 15 by the memory controller 16. The image data corresponding to a range needed for the zoom processing (e.g., only that image data) is read out from the memory 15. The read-out image data is input to the interpolation unit 13 so that the image data is interpolated. The interpolated image data is magnified by the magnification unit 14.

However, in Mode 1, a high speed processing clock proportional to the magnification power is needed. That is, to obtain an N-times magnified image, an N-times processing clock is needed. Thus, to obtain a high magnification image, consumption power increases and a large-scale logical circuit operating at a high speed clock is needed.

Figure 6:
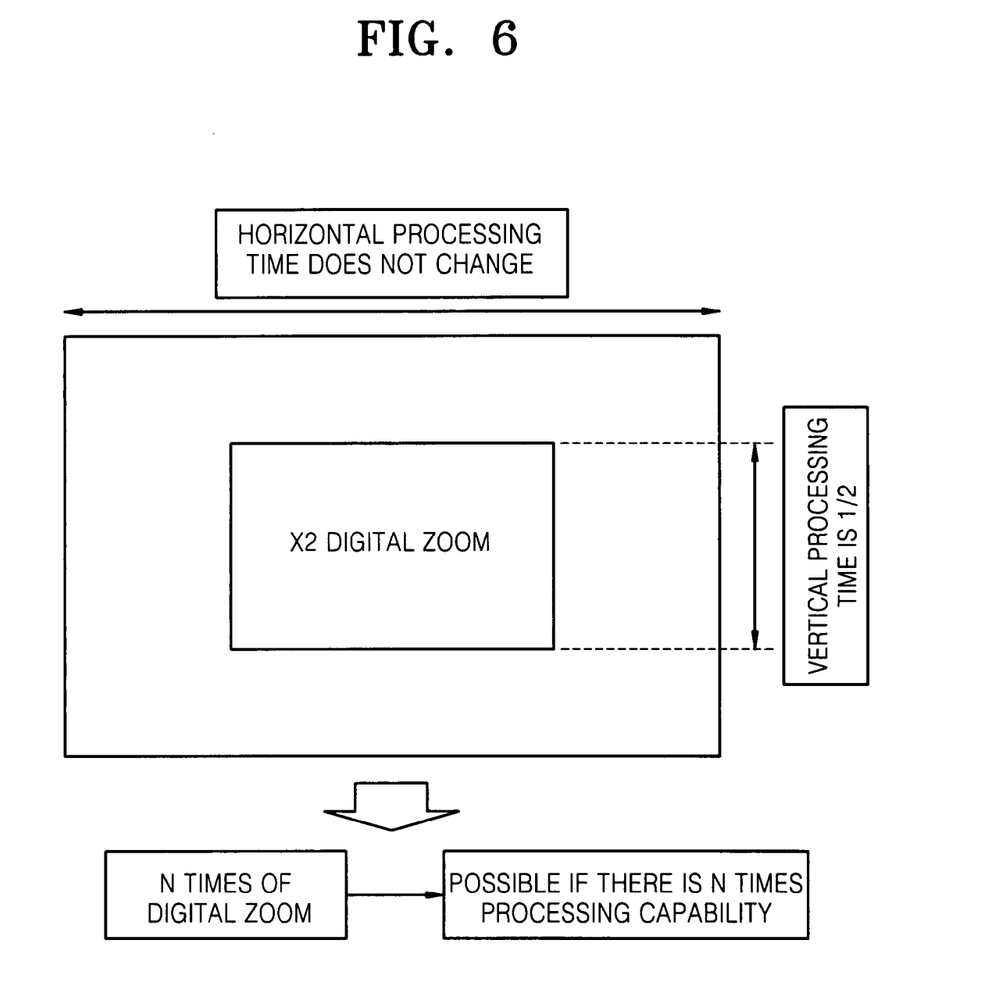
FIG. 6 illustrates the digital zoom processing time of the operation of the photographing apparatus shown in FIG. 5.

FIG. 6 illustrates the digital zoom processing time of the operation of the photographing apparatus shown in FIG. 5. In Mode 1, when image data is magnified twice, for example, while vertical processing time is reduced to ½, horizontal processing time is not changed. Thus, to magnify image data twice, the magnification processing needs to be performed with twice greater processing capability than before magnification. Since in Mode 1, N-times greater processing capability than before magnification is needed to perform N-times greater processing after magnification, as a magnification power increases, the processing capability needed for the photographing apparatus therefore proportionally increases. As the processing capability increases, a high speed clock is needed, and thus, the size and complexity of the circuit increases.

In Mode 2, as the magnification power increases, the range of the image that is temporarily stored can be decreased. Thus, when the magnification power increases, the amount of writing or reading out decreases so that the overall process can be efficiently performed. However, when the magnification power decreases, the overall process becomes inefficient because an image in a range that is almost the same as that of the photographed image is written or read out.

SUMMARY OF THE INVENTION

To solve the above and/or other problems, an embodiment of the present invention provides a photographing apparatus and method which can photograph a magnified image in a large magnification range by combining Mode 1 and Mode 2 in the digital zoom processing method.

According to an aspect of the present invention, a photographing apparatus comprises a first digital zoom device, a second digital zoom device capable of zooming at a higher magnification power than the first digital zoom device, a manipulation unit for performing manipulation of zoom, and a conversion unit for performing conversion between the first and second digital zoom devices when a predetermined magnification power is reached through the manipulation of the manipulation unit.

According to the above structure, the manipulation unit performs zoom manipulation. When a predetermined magnification power is reached by the manipulation of the manipulation unit, the conversion unit converts between the first digital zoom device and the second digital zoom device. As a result, when the magnification power of the digital zoom reaches a predetermined magnification power by manipulating the manipulation unit, the digital zoom device is converted so that an enlarged image having a wide zoom magnification power range can be photographed.

The first digital zoom device is appropriate for a low zoom magnification power and the second digital zoom device is appropriate for a high zoom magnification power. As a result, by converting between the first and second digital zoom devices, an enlarged image having a wide zoom magnification power range can be photographed.

The photographing apparatus further comprises a photographing unit for photographing an object and acquiring image data, and a magnification unit for magnifying the acquired image data. The first digital zoom device in this arrangement can be, for example, a zoom device that directly magnifies the image data acquired by the photographing unit using the magnification unit. According to this structure, the photographing unit photographs an object to acquire image data and the magnification unit directly performs magnification process with respect to the image data acquired by the photographing unit. As a result, the time for obtaining an enlarged image data from the image data acquire by the photographing unit can be reduced.

The photographing apparatus further comprises a photographing unit for photographing an object and acquiring image data, an image storing unit for temporarily storing the image data acquired by the photographing unit, and a magnification unit for magnifying the acquired image data. The second digital zoom device in this arrangement can be, for example, a zoom device that temporarily stores the image data acquired by the photographing unit in the image storing unit and reads out a portion of the image data stored in the image storing unit to magnify the read-out portion of the image data using the magnification unit. According to this structure, the photographing unit photographs an object to acquire image data, the image storing unit temporarily stores the image data acquired by the photographing unit, and the magnification unit reads out a portion of the image data stored in the image storing unit to magnify the read portion of the image data. As a result, when the zoom magnification power is high, the efficiency in the magnification of the image data acquired by the photographing unit can be increased.

The variable range of the magnification powers of the first and second digital zoom devices overlaps the variable range between a first magnification power and a second magnification power that is higher than the first magnification power, and the conversion unit performs conversion from the first digital zoom device to the second digital zoom device at the second magnification power for zoom up and conversion from the second digital zoom device to the first digital zoom device at the first magnification power for zoom down. According to this structure, the conversion unit performs conversion from the first digital zoom device to the second digital zoom device at the second magnification power for zoom up, and conversion from the second digital zoom device to the first digital zoom device at the first magnification power for zoom down. When the first digital zoom device and the second digital zoom device are converted, the variable range of the magnification powers of the first and second digital zoom devices overlaps the variable range between the first magnification power and the second magnification power that is higher than the first magnification power. As a result, the range of zoom magnification is wide because of the efficiency in zooming by each digital zoom device, and an enlarged image that is less affected by frame delay or frame skip generated during the conversion between the digital zoom devices can be photographed.

According to another aspect of the present invention, a photographing method comprises performing zoom manipulation, determining whether a magnification power according to the zoom manipulation reaches a predetermined reference magnification power to convert between a first digital zoom device and a second digital zoom device capable of zooming at a higher magnification power than the first digital zoom device, and converting the first digital zoom device and the second digital zoom device when the magnification power reaches the predetermined magnification.

According to the method, in the manipulation operation, zoom manipulation is performed. In the determination operation, it is determined whether a magnification power according to the zoom manipulation has reached a predetermined reference magnification power to convert between a first digital zoom device and a second digital zoom device capable of zooming at a higher magnification power than the first digital zoom device. In the conversion operation, the first digital zoom device and the second digital zoom device are converted when the magnification power reaches the predetermined magnification. As a result, when the magnification power of the digital zoom by the manipulation in the manipulation operation reaches the predetermined magnification, the digital zoom device is converted so that an enlarged image having a wide range of zoom magnification power can be photographed.

The photographing method further comprises photographing an object and acquiring image data and magnifying the acquired image data The first digital zoom device in this arrangement can be, for example, a zoom device that directly magnifies the image data acquired in the photographing operation using the magnification unit. According to this method, in the photographing operation, an object is photographed to acquire image data. In the magnification operation, the acquired image data is directly magnified. As a result, the time for obtaining an enlarged image data from the image data acquire by the photographing unit can be reduced.

The photographing method further comprises photographing an object and acquiring image data, temporarily storing the image data acquired in the photographing operation, and magnifying the acquired image data In this arrangement, the second digital zoom device can be, for example, a zoom device that temporarily stores in the image storing operation the image data acquired in the photographing operation and reads out a portion of the image data stored in the image storing operation to magnify the read-out portion of the image data in the magnifying operation. According to this method, in the photographing operation, an object is photographed to acquire image data. In the image storing operation, the image data acquired in the photographing operation is temporarily stored. In the magnification operation, a portion of the stored image data is read out and magnified. As a result, when the zoom magnification power is high, the efficiency in magnification of the image data acquired by the photographing unit can be improved.

The variable range of the magnification powers of the first and second digital zoom devices overlaps the variable range between a first magnification power and a second magnification power that is higher than the first magnification power, and the conversion unit performs conversion from the first digital zoom device to the second digital zoom device at the second magnification power for zoom up and conversion from the second digital zoom device to the first digital zoom device at the first magnification power for zoom down. According to this structure, in the conversion operation, conversion from the first digital zoom device to the second digital zoom device is performed at the second magnification power for zoom up and conversion from the second digital zoom device to the first digital zoom device is performed at the first magnification power for zoom down. When the first digital zoom device and the second digital zoom device are converted, the variable range of the magnification powers of the first and second digital zoom devices overlaps the variable range between the first magnification power and the second magnification power that is higher than the first magnification power. As a result, the range of zoom magnification is wide because of the efficiency in zooming by each digital zoom device and an enlarged image that is less affected by frame delay or frame skip generated during the conversion between the digital zoom devices can be photographed.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE EMBODIMENTS

The attached drawings for illustrating preferred embodiments of the present invention are referred to in order to gain a sufficient understanding of the present invention, the merits thereof, and the objectives accomplished by the implementation of the present invention. Hereinafter, exemplary embodiments of the present invention will be described in detail with reference to the attached drawings. Like reference numerals in the drawings denote like elements.

Figure 1:
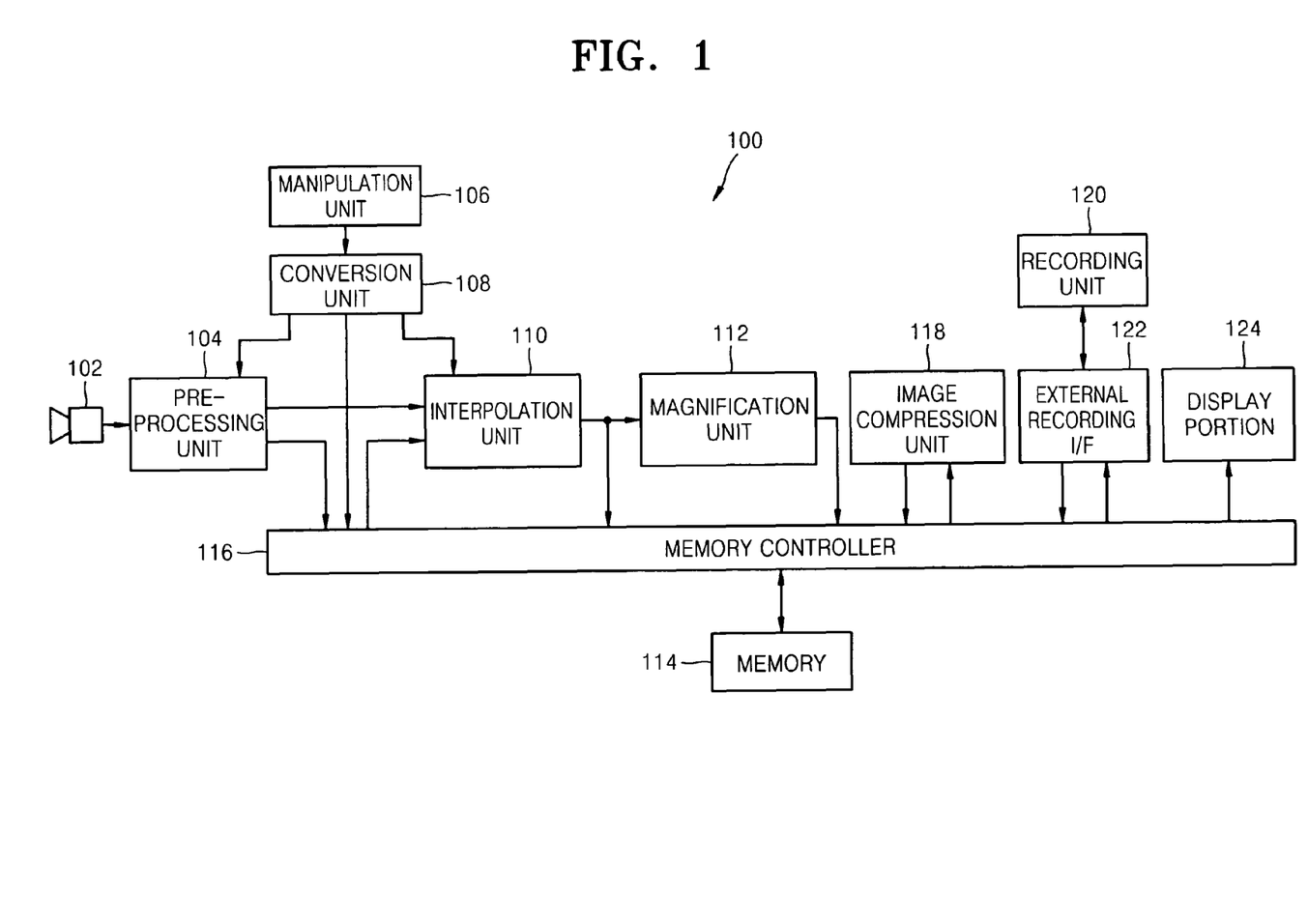
FIG. 1 is a block diagram illustrating an example of the configuration of a photographing apparatus according to an embodiment of the present invention.

FIG. 1 is a block diagram illustrating an example of the configuration of a photographing apparatus according to an embodiment of the present invention. Referring to FIG. 1, a photographing apparatus 100 according to an embodiment of the present invention includes a photographing unit 102, a pre-processing unit 104, a manipulation unit 106, a conversion unit 108, an interpolation unit 110, a magnification unit 112, a memory 114, a memory controller 116, an image compression unit 118, a recording unit 120, an external recording I/F (interface) 122, and a display portion 124.

The photographing unit 102 acquires image data that becomes the base of an image by performing photographing of an object. The image data is acquired by performing a object photographing motion according to the operation of a shutter button (not shown). Although it is not illustrated, the photographing unit 102 includes a zoom lens for magnifying an image of an object, a focus lens for adjusting the focus of the object, an aperture for controlling light input from the object, a photographing device for converting light input from the object to an analog electric signal, and an A/D (analog/digital) converter for converting the analog electric signal to a digital electric signal. The photographing device converts light to an electric signal using a device such as a charge coupled device (CCD) sensor or a complementary metal oxide semiconductor (CMOS) sensor.

The pre-processing unit 104 performs pre-processing to the image data acquired by the photographing unit 102. The pre-processing unit 104 generates evaluation values by performing the pre-processing operation, for example, auto exposure (AE), auto focus (AF), and auto white balance (AWB). Thus, by performing the pre-processing of the image data, appropriated image data can be generated.

The manipulation unit 106 performs various manipulations for the operation of the photographing apparatus 100. Although it is not illustrated, the manipulation unit 106 includes a shutter button inputting the photographing of an image, a record start button, a zoom up/down button for inputting when zoom photographing is performed, and a set button inputting various settings to the photographing apparatus 100.

When the zoom magnification power reaches a predetermined magnification power by the manipulation of the manipulation unit 106, the conversion unit 108 converts the digital zoom processing method from Mode 1 to Mode 2 or from Mode 2 to Mode 1. In this exemplary embodiment, when the conversion unit 108 determines that the present time is a mode conversion point, the conversion unit 108 transmits a predetermined signal to each of the pre-processing unit 104, the interpolation unit 110, and the memory controller 116 to convert the flow of image data for the digital zoom processing. When the zoom magnification power reaches a predetermined magnification power, the conversion unit 108 converts the mode to the digital zoom mode so that the digital zoom processing can be performed at a magnification power in a greater range. The digital zoom converting method will be described later.

The interpolation unit 110 interpolates the image data that is pre-processed by the pre-processing unit 104. By performing the interpolation process, the resolution of the image is increased so that a more detailed image can be obtained. The interpolation method by the interpolation unit 110 includes a nearest neighbor interpolation method, a bilinear interpolation method, and a bicubic interpolation method.

The magnification unit 112 electronically magnifies the image data interpolated by the interpolation unit 110. By electronically magnifying the image data, the magnification unit 112 can magnify the object larger than that magnified by the zoom lens.

The memory 114 is an example of an image storing unit of an embodiment of the present invention. The image data photographed by the photographing unit 102 or magnified by the magnification unit 112 is temporarily stored in the memory 114. By temporarily storing the image data photographed by the photographing unit 102 in the memory 114, the image data can be used in various ways. The storing of the image data in the memory 114 and the reading out of the image data from the memory 114 are performed according to the control of the memory controller 116.

The memory controller 116 controls the storing of the image data in the memory 114 and the reading out of the image data from the memory 114. The image compression unit 118 compresses the photographed or magnified image. The compression format includes, for example, the JPEG (joint photographic experts group) format or MPEG (moving picture experts group) format, or any other suitable format.

The recording unit 120 records the photographed image. As an example of the recording unit 120, magnetic tape such as video tapes, non-volatile recording media, HDDs, CDs, or DVDs can be used. An image is recorded in the recording unit 120 through the external recording I/F 122.

The display unit 124 displays the photographed image or a live view image. The display unit 124 can display various settings of the photographing unit 100 in addition to the image. For example, an LCD (liquid crystal display) can be used as the display unit 124.

A photographing method according to an embodiment of the present invention will be described below.

In the general zoom processing method using a digital zoom of a photographing apparatus such as a digital camera or a digital video camera, an optical zoom processing method is used by moving a zoom lens to a certain magnification power and a digital zoom processing method is used after a predetermined magnification power is reached. Also, in a case in which a lens is included in a mobile phone or in a photographing apparatus which cannot move the zoom lens much like a small thin type digital camera, all zoom processing can be performed in the digital zoom processing method.

As described above, the digital zoom processing method includes two types of Modes. In Mode 1, the photographed image is directly magnified and in Mode 2, the photographed image is temporarily stored and the portion (e.g., only the portion) needed for zoom processing is read out to be magnified. In the present embodiment, the zoom magnification power increases by converting the digital zoom to Mode 1 or Mode 2 during the digital zoom processing using the aspects of Mode 1 and Mode 2 processing.

In Mode 1, the photographed image data is used as it is, while in Mode 2, the image data is stored in the memory 114 which generates a delay corresponding to a portion matching one frame. When the digital zoom mode is converted without considering the delay of the one frame portion, image is not continuous at a point of the mode change so that a discontinuous and unnatural image is generated. Thus, when the digital zoom mode is changed from Mode 1 to Mode 2 or from Mode 2 to Mode 1, there is a need to consider the delay of the one frame portion in Mode 2.

Thus, in the present embodiment, considering the efficiency of the two types of the digital zoom processing, the zoom magnification range of the two types of digital zooms are partially combined and the conversion magnification powers between the modes are set differently for zoom up and zoom down. Thus, even when the digital zoom mode is converted to Mode 1 or Mode 2, the image can be smoothly displayed.

Figure 2:
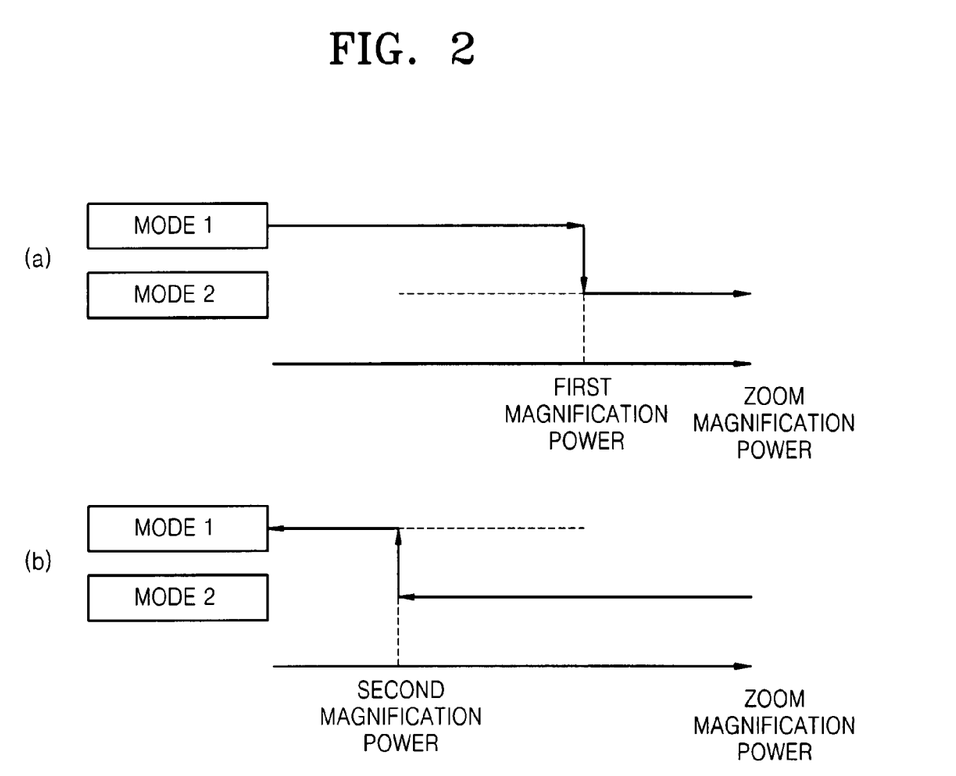
FIGS. 2A and 2B illustrate an example of the changes of a digital zoom mode according to an embodiment of the present invention.

FIGS. 2A and 2B illustrate an example of the changes of a digital zoom mode according to an embodiment of the present invention. FIG. 2A illustrates the operation of the conversion from Mode 1 to Mode 2. FIG. 2B illustrates the operation of the conversion from Mode 2 to Mode 1. As shown in FIG. 2, variable magnification powers of Mode 1 and Mode 2 are that zoom magnification overlaps between the first magnification power and the second magnification power and the first magnification power is higher than the second magnification power. The first magnification power is a magnification power to covert the digital zoom from Mode 1 to Mode 2. The second magnification power is a magnification power to covert the digital zoom from Mode 2 to Mode 1.

As the zoom magnification powers are combined and different magnification powers during zoom up and zoom down are made as the standard in the mode conversion, the unsmooth mode conversion can be reduced. Also, by combining the zoom magnification powers considering the characteristics of a zoom 1 exhibiting a superior processing efficiency as the zoom magnification power decreases and a zoom 2 exhibiting a superior processing efficiency as the zoom magnification power increases, the circuit size is increased so that a zoom magnification power in a wide range can be obtained without a high speed clock. Thus, a digital zoom capable of more effectively using the memory 114 can be provided.

Figure 3:
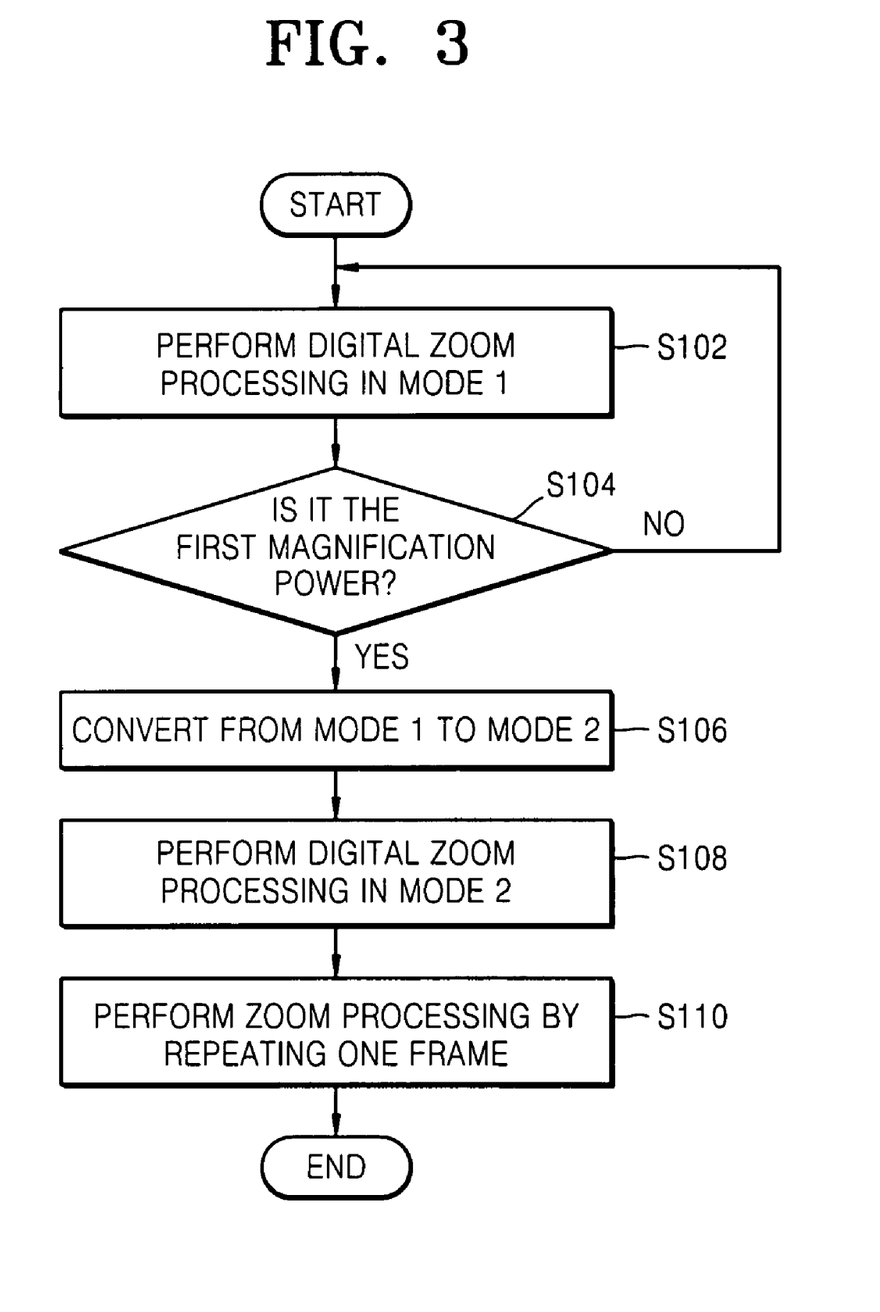
FIG. 3 is a flow chart showing an example of the photographing operation when the digital zoom is converted from Mode 1 to Mode 2 in a photographing method according to an embodiment of the present invention.
Figure 4:
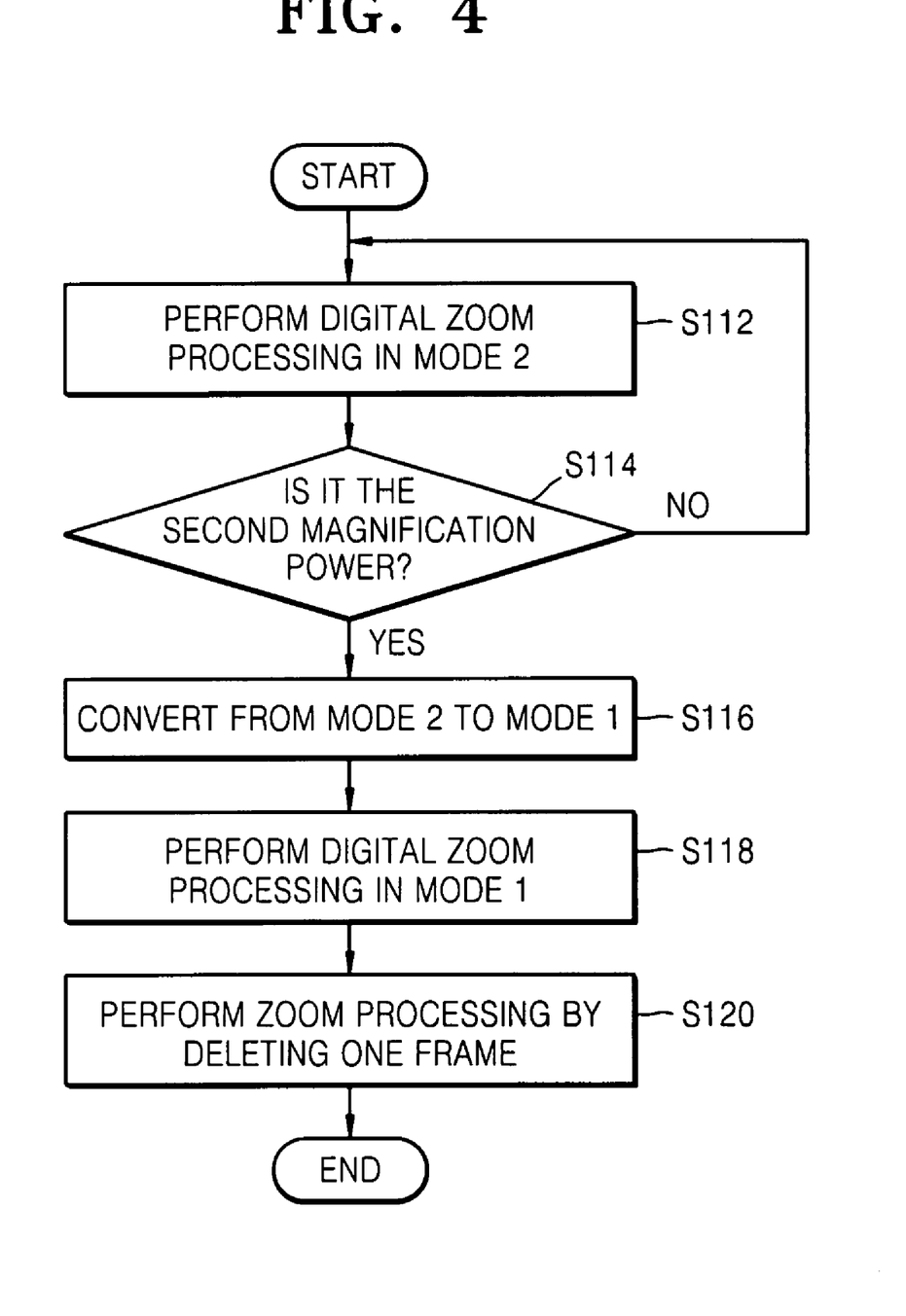
FIG. 4 is a flow chart showing an example of the photographing operation when the digital zoom is converted from Mode 2 to Mode 1 in a photographing method according to an embodiment of the present invention.

FIG. 3 is a flow chart showing an example of the photographing operation when the digital zoom is converted from Mode 1 to Mode 2 in a photographing method according to an embodiment of the present invention. FIG. 4 is a flow chart showing an example of the photographing operation when the digital zoom is converted from mode 2 to mode 1 in a photographing method according to an embodiment of the present invention. Referring to FIGS. 3 and 4, first, digital zoom is processed in Mode 1 in step S102. In this case, the magnification power of the digital zoom is set to be less than the first magnification power. A photographer manipulates the manipulation unit 106 to change the magnification power of the digital zoom. The conversion unit 108 determines whether the zoom magnification power manipulated by the manipulation unit 106 is the first magnification power in step S104. When the zoom magnification power is determined not to be the first magnification power in step S104, the program returns to step S102 and the digital zoom processing performed in Mode 1. When the zoom magnification power reaches the first magnification power in step S104, the digital zoom mode is converted from Mode 1 to Mode 2 in step S106. Then, the digital zoom is processed in Mode 2 in step S108.

In the present embodiment, when the conversion unit 108 determines that it is a mode conversion point, the conversion unit 108 transmits predetermined signals to the pre-processing unit 104, the interpolation unit 110, and the memory controller 116 to convert the flow of image data in the digital zoom. That is, although in Mode 1 the image data processed by the pre-processing unit 104 is directly transmitted to the interpolation unit 110, when the mode is converted to Mode 2, the image data processed by the pre-processing unit 104 is stored once in the memory 114 by the memory controller 116 according to the signal transmitted by the conversion unit 108 and a necessary area (e.g., only that necessary area) is read out from the memory 114 so that the read-out image data is transferred to the interpolation unit 110.

During the photographing of moving picture, when the digital zoom is converted from Mode 1 to Mode 2, since in Mode 2 zoom processing is performed using the image data before one frame, an image corresponding to one frame is skipped. Thus, in the present embodiment, to prevent the frame skip, an image corresponding to one frame just before the digital zoom mode is converted is repeatedly used to perform the zoom processing in step S110. Then, the digital zoom processing is performed using Mode 2.

When Mode 1 is converted to Mode 2, by performing the zoom processing repeatedly using the image corresponding to one frame before the conversion, the frame skip is prevented so that natural moving image can be photographed.

Referring to FIG. 4, when the digital zoom is converted from Mode 2 to Mode 1, first, the digital zoom is processed in Mode 2 in step S112. The magnification power of the digital zoom is set to be greater than the second magnification power. A photographer manipulates the manipulation unit 106 to change the magnification power. The conversion unit 108 determines whether the zoom magnification power manipulated by the manipulation unit 106 is the second magnification power in step S114. When the zoom magnification power is determined not to be the second magnification power in step S114, the program returns to step S112 and the digital zoom processing performed in Mode 2. When the zoom magnification power reaches the second magnification power in step S114, the digital zoom mode is converted from Mode 2 to Mode 1 in step S116. Then, the digital zoom is processed in Mode 1 in step S118.

In this embodiment, when the conversion unit 108 determines that it is a mode conversion point, the conversion unit 108 transmits predetermined signals to the pre-processing unit 104, the interpolation unit 110, and the memory controller 116 to convert the flow of image data in the digital zoom. That is, although in Mode 2, the image data processed by the pre-processing unit 104 is stored once in the memory 114 by the memory controller 116 and an image data (e.g., on that image data) of a necessary area is read out from the memory 114 so that the read-out image data is transferred to the interpolation unit 110, when the mode is converted to Mode 1, the image data processed by the pre-processing unit 104 is transmitted to the interpolation unit 110 according to the signal transmitted by the conversion unit 108.

During the photographing of moving picture, when the digital zoom is converted from Mode 2 to Mode 1, since in Mode 2 zoom processing is performed using the image data before one frame, the same frame can be zoom processed. Thus, in the present embodiment, to prevent the frame overlap, an image corresponding to one frame just before the digital zoom mode is converted is deleted in step S120. Then, the digital zoom processing is performed using Mode 1.

When Mode 2 is converted to Mode 1, by performing the zoom processing by deleting the image corresponding to one frame before the conversion, the frame overlap of the photographed frame is prevented so that natural moving image can be photographed.

As described above, in the embodiments of the photographing apparatus and method according to the present invention, when an image magnified by digital zoom is to be photographed, two types of modes are set and, when a predetermined magnification power is reached, the digital zoom mode is converted so that a magnified image in a greater magnification power range can be photographed using the merits of each mode.

Also, the variable magnification power of Mode 1 and the variable magnification power of Mode 1 are combined between the first and second magnification powers. Thus, when Mode 1 is converted to Mode 2, zoom processing is performed by repeatedly using the image corresponding to one frame just before the conversion so that the discontinuity of an image is prevented and a natural magnified image can be photographed. When Mode 2 is converted to Mode 1, zoom processing is performed by deleting an image corresponding to one frame just before the conversion so that the discontinuity of an image is prevented and a natural magnified image can be photographed.

Furthermore, the processing can be performed by installing a storing unit (not shown) in the photographing apparatus 100 and reading out computer programs stored in the storing unit. The storing unit may be various ROMs (read only memory).

As described above, in the embodiments of the photographing apparatus and method according to the present invention, the zoom magnification power is changed by manipulating the manipulation unit 106. When the zoom magnification power reaches a predetermined magnification power, the digital zoom processing method is converted so that digital zoom having a magnification power in a wide range can be embodied. When the digital zoom processing method is converted, the image corresponding to one frame is repeatedly magnified or deleted so that the discontinuity of an image is prevented and a naturally magnified image can be photographed.

In one embodiment, for example, the first magnification power is about 1.5-1.6 times and the second magnification power is about 1.2-1.3 times. The first and second magnification powers in the present invention are not limited thereto and can be appropriately changed according to the performance of the photographing apparatus.

Also, by selectively using the two types of digital zoom modes by converting the modes, even a photographing apparatus such as a compact and thin digital camera which is not able to greatly move a zoom lens enables digital zoom processing in a wide range of a zoom magnification power so that a magnified photographing of an object is possible.

While this invention has been particularly shown and described with reference to preferred embodiments thereof, it will be understood by those skilled in the art that various changes in form and details may be made therein without departing from the spirit and scope of the invention as defined by the appended claims. For example, in the above-described embodiment, the mode conversion is performed by combining the zoom magnification powers of the digital zoom modes. However, the present invention is not limited thereto. For example, the conversion from Mode 1 to Mode 2 and the conversion from Mode 2 to Mode 1 can be performed when the same zoom magnification power is reached.

According to the embodiments of the present invention described above, in the digital zoom processing method, by combining two types of methods, a magnified object having a wide range of a magnification power can be photographed. Also, by combining two types of digital zoom variable magnification powers, the effect of a frame delay or frame skip generated during the conversion of the digital zoom means can be reduced.

What is claimed is:

1. A photographing apparatus comprising:
    a first digital zoom device capable of zooming up or down within a first continuous range of magnification powers;
    a second digital zoom device capable of zooming up or down within a second continuous range of magnification powers which at least partially includes higher magnification powers than the magnification powers in the first continuous range and at least partially overlaps with the first continuous range between a first magnification power and a second magnification power that is higher than the first magnification power;
    a manipulation unit that performs a manipulation of zooming up or down; and
    a conversion unit that performs a conversion from the first digital zoom device to the second digital zoom device at the second magnification power for zoom up and conversion from the second digital zoom device to the first digital zoom device at the first magnification power for zoom down through the manipulation of the manipulation unit.

2. The photographing apparatus of claim 1, wherein the first digital zoom device is appropriate for a low zoom magnification power and the second digital zoom device is appropriate for a high zoom magnification power.

3. The photographing apparatus of claim 2, further comprising:
    a photographing unit that photographs an object and acquires image data; and
    a magnification unit that magnifies the acquired image data,
    wherein the first digital zoom device is a zoom device that directly magnifies the image data acquired by the photographing unit using the magnification unit.

4. The photographing apparatus of claim 2, further comprising:
    a photographing unit that photographs an object and acquires image data;
    an image storing unit that temporarily stores the image data acquired by the photographing unit; and
    a magnification unit that magnifies the acquired image data,
    wherein the second digital zoom device is a zoom device that temporarily stores the image data acquired by the photographing unit in the image storing unit and reads out a portion of the image data stored in the image storing unit to magnify the read-out portion of the image data using the magnification unit.

5. The photographing apparatus of claim 1, further comprising:
   a photographing unit that photographs an object and acquires image data; and
   a magnification unit that magnifies the acquired image data,
   wherein the first digital zoom device is a zoom device that directly magnifies the image data acquired by the photographing unit using the magnification unit.

6. The photographing apparatus of claim 5, further comprising an interpolation unit that interpolates the acquired image data to increase the resolution of the image data.

7. The photographing apparatus of claim 1, further comprising:
   a photographing unit that photographs an object and acquires image data;
   an image storing unit that temporarily stores the image data acquired by the photographing unit; and
   a magnification unit that magnifies the acquired image data,
   wherein the second digital zoom device is a zoom device that temporarily stores the image data acquired by the photographing unit in the image storing unit and reads out a portion of the image data stored in the image storing unit to magnify the read-out portion of the image data using the magnification unit.

8. The photographing apparatus of claim 7, wherein when converting from the first digital zoom device to the second digital zoom device, the second digital zoom device repeatedly uses image data corresponding to one frame just before converting to the second digital zoom device to perform zoom processing to prevent frame skip.

9. The photographing apparatus of claim 8, wherein when converting from the second digital zoom device to the first digital zoom device, image data corresponding to one frame just before converting to the first digital zoom device is deleted before the first digital zoom device performs zoom processing to prevent frame overlap.

10. A photographing method comprising:
    performing zoom up or down manipulation;
    determining whether a magnification power according to the zoom manipulation reaches a predetermined reference magnification power to convert between a first digital zoom device capable of zooming up or down within a first continuous range of magnification powers and a second digital zoom device capable of zooming up or down within a second continuous range of magnification powers which at least partially includes higher magnification powers than the magnification powers in the first continuous range and at least partially overlaps with the first continuous range between a first magnification power and a second magnification power that is higher than the first magnification power; and
    converting from the first digital zoom device to the second digital zoom device at the second magnification power for zoom up and converting from the second digital zoom device to the first digital zoom device at the first magnification power for zoom down.

11. The photographing method of claim 10, further comprising:
    photographing an object and acquiring image data; and
    magnifying the acquired image data,
    wherein the first digital zoom device is a zoom device that directly magnifies the image data acquired in the photographing operation using the magnification unit.

12. The method of claim 11, further comprising interpolating the acquired image data to increase the resolution of the image data.

13. The photographing method of claim 10, further comprising:
    photographing an object and acquiring image data;
    temporarily storing the image data acquired in the photographing operation; and
    magnifying the acquired image data,
    wherein the second digital zoom device is a zoom device that temporarily stores in the image storing operation the image data acquired in the photographing operation and reads out a portion of the image data stored in the image storing operation to magnify the read-out portion of the image data in the magnifying operation.

14. The method of claim 13, wherein when converting from the first digital zoom device to the second digital zoom device, the second digital zoom device repeatedly uses image data corresponding to one frame just before converting to the second digital zoom device to perform zoom processing to prevent frame skip.

15. The method of claim 14, wherein when converting from the second digital zoom device to the first digital zoom device, image data corresponding to one frame just before converting to the first digital zoom device is deleted before the first digital zoom device performs zoom processing to prevent frame overlap.

16. A non-transitory computer readable medium of instructions for controlling a photographing apparatus, the instructions comprising:
    a first set of instructions for controlling the photographing apparatus to perform zoom up or down manipulation;
    a second set of instructions for determining whether a magnification power according to the zoom manipulation reaches a predetermined reference magnification power to convert between a first digital zoom device capable of zooming up or down within a first continuous range of magnification powers and a second digital zoom device capable of zooming up or down within a second continuous range of magnification powers which at least partially includes higher magnification powers than the magnification powers in the first continuous range and at least partially overlaps with the first continuous range between a first magnification power and a second magnification power that is higher than the first magnification power; and
    a third set of instructions for converting from the first digital zoom device to the second digital zoom device at the second magnification power for zoom up and converting from the second digital zoom device to the first digital zoom device at the first magnification power for zoom down.

17. The computer readable medium of instructions of claim 16 further comprising:
    a fourth set of instructions for controlling the photographing apparatus to photograph an object and acquire image data; and
    a fifth set of instructions for controlling the photographing apparatus to magnify the acquired image data,
    wherein the first digital zoom device is a zoom device that directly magnifies the image data acquired in the photographing operation using the magnification unit.

18. The computer readable medium of instructions of claim 17, further comprising another set of instructions for controlling the photographing apparatus to interpolate the acquired image data to increase the resolution of the image data.

19. The computer readable medium of instructions of claim 16, further comprising:
   a sixth set of instructions for controlling the photographing apparatus to photograph an object and acquiring image data;
   a seventh set of instructions for controlling the photographing apparatus to temporarily store the image data acquired in the photographing operation; and
   an eighth set of instructions for controlling the photographing apparatus to magnify the acquired image data,
   wherein the second digital zoom device is a zoom device that temporarily stores in the image storing operation the image data acquired in the photographing operation and reads out a portion of the image data stored in the image storing operation to magnify the read-out portion of the image data in the magnifying operation.

20. The computer readable medium of instructions of claim 19, wherein:
   when converting from the first digital zoom device to the second digital zoom device, the second digital zoom device repeatedly uses image data corresponding to one frame just before converting to the second digital zoom device to perform zoom processing to prevent frame skip; and
   when converting from the second digital zoom device to the first digital zoom device, image data corresponding to one frame just before converting to the first digital zoom device is deleted before the first digital zoom device performs zoom processing to prevent frame overlap.

21. The photographing apparatus of claim 1, wherein:
   the first digital zoom device zooms up or down within a first continuous range of magnification powers;
   the second digital zoom device zooms up or down within a second continuous range of magnification powers; and
   the conversion unit performs a conversion between the first and second digital zoom devices when a predetermined magnification power threshold is reached through the manipulation of the manipulation unit in zooming up or down continuously within the first and second continuous ranges.

* * * * *